April 25, 1967 L. B. MYTINGER 3,315,716
FENCE FOR TILTING ARBOR SAW
Filed May 17, 1965 2 Sheets-Sheet 1

INVENTOR.
Lawrance B. Mytinger
BY
Harness, Dickey & Pierce
ATTORNEYS.

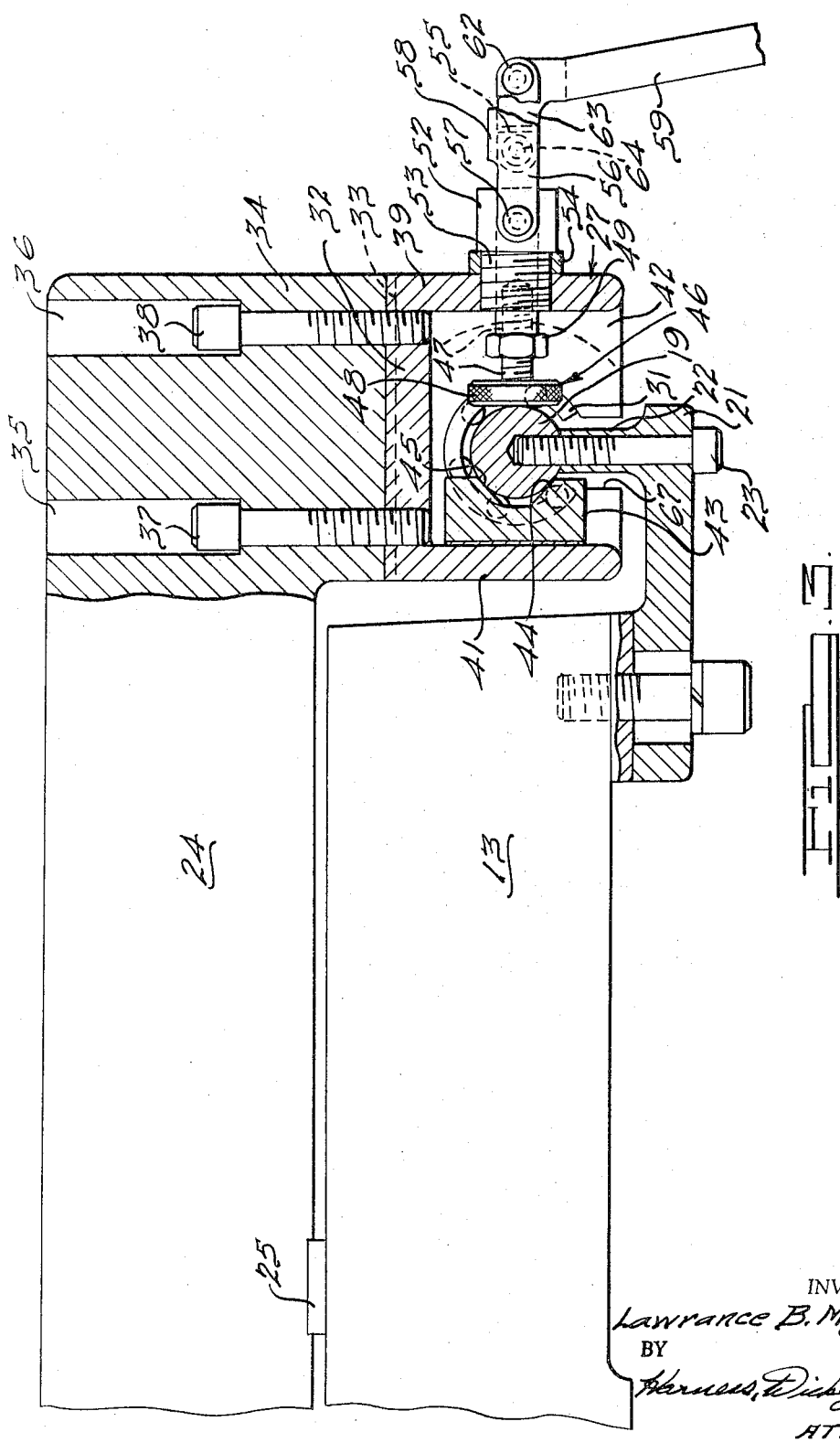

3,315,716
FENCE FOR TILTING ARBOR SAW
Lawrance B. Mytinger, Port Huron, Mich., assignor to Moak Machine and Foundry Company, Port Huron, Mich., a corporation of Michigan
Filed May 17, 1965, Ser. No. 456,247
5 Claims. (Cl. 143—174)

This invention relates to tilting arbor saws, and more particularly to means for adjusting and locking in position the guide fences used with such saws.

It is an object of the invention to provide a novel and improved fence clamp and guide means for a tilting arbor saw which will maintain the fence parallel to the saw blade while it is being laterally adjusted, and will not permit shifting of the fence when it is being clamped or unclamped, thus eliminating the need for repeated adjustment of the fence to locate it properly.

Other objects, features and advantages of the present invention will become apparent from the subsequent description, taken in conjunction with the accompanying drawings.

In the drawings:

FIGURE 3 is a cross-sectional view in elevation taken along the line 3—3 of FIGURE 2 and showing the construction of the guide and clamp.

Briefly, the illustrated embodiment of the invention comprises a guide bar of circular cross-sectional shape secured to the front of the table, and an elongated housing partially surrounding said bar. One end of the fence is secured to the upper central portion of the housing, and the opposite end portions of the housing carry first and second bearings which are engageable with the bar, permitting both rotational and longitudinal movement of the housing but without appreciable play. The bearings are spaced from the central portion of the housing to which the fence is secured, and are on opposite sides of a central compartment which contains the clamping means. This clamping means comprises a V-block secured to the rear wall of the housing and a reciprocable clamp diametrically opposed to the V-block and supported for movement by the front wall of the housing. A link is pivotally secured to and extends forwardly from the front housing wall, and supports a pivotally mounted handle which is in turn pivotally connected to the clamp, the parts forming a toggle linkage.

In one position of the handle, the clamp will be pressed against the bar, thereby pulling the housing forwardly so that the V-block engages the opposite side of the bar, locking the fence in position. Since these forces are in the plane of symmetry of the fence, there will be no components tending to rock the fence laterally. When unclamped, the housing can be shifted along the bar, and the fit and positions of the bearings will be such as to maintain the parallelism between the fence and saw during this adjustment.

Figure 1:
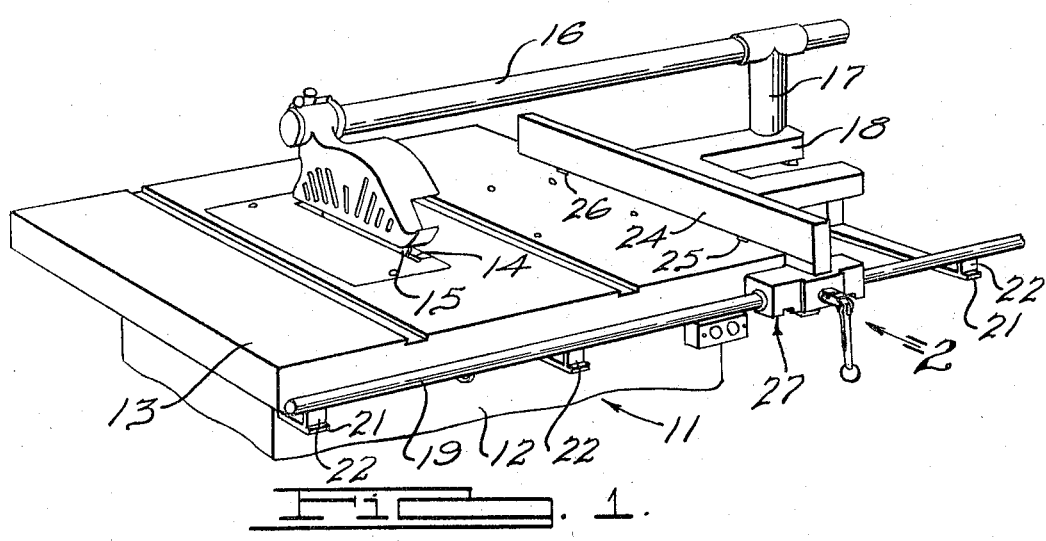
FIGURE 1 is a perspective view of the upper portion of a tilting arbor saw incorporating the novel fence guide and clamp of this invention.

Referring more particularly to the drawings, a tilting arbor saw is generally indicated at 11 in FIGURE 1 and comprises a base 12 and a table 13. The table has a slot 14 for accommodating saw blade 15, the latter being supported by one end of an arm 16. The other end of the arm is supported by an upright 17 mounted on an extension 18 at the right-hand end of the table.

A guide bar 19 is secured to the front of table 13 by means of brackets 21, the guide bar extending parallel to the rotational axis of saw blade 15 and being spaced forwardly of and somewhat below the surface of table 13. Bar 19 is of circular cross-sectional configuration, and brackets 21 are secured to the underside of the forward table edge and extend forwardly therefrom. The brackets have upward extensions 22 which are engageable with and support the underside of bar 19 at spaced intervals, being secured thereto by bolts 23 which are threaded into the bar, as seen in FIGURE 3. Extensions 22 are considerably narrower than the diameter of bar 19, thus leaving a major portion of the bar exposed along its entire extent.

A fence 24 is provided for table 13. This fence is for the purpose of guiding workpieces resting on the table so that they may be slid forwardly or backwardly during sawing operations. The fence 24 is of rectangular cross-sectional shape with the wider sides being vertically disposed, and has a pair of pads 25 and 26 secured to the underside thereof, as seen in FIGURE 1, so that the fence will be parallel to and spaced slightly upwardly from table 13.

Figure 2:
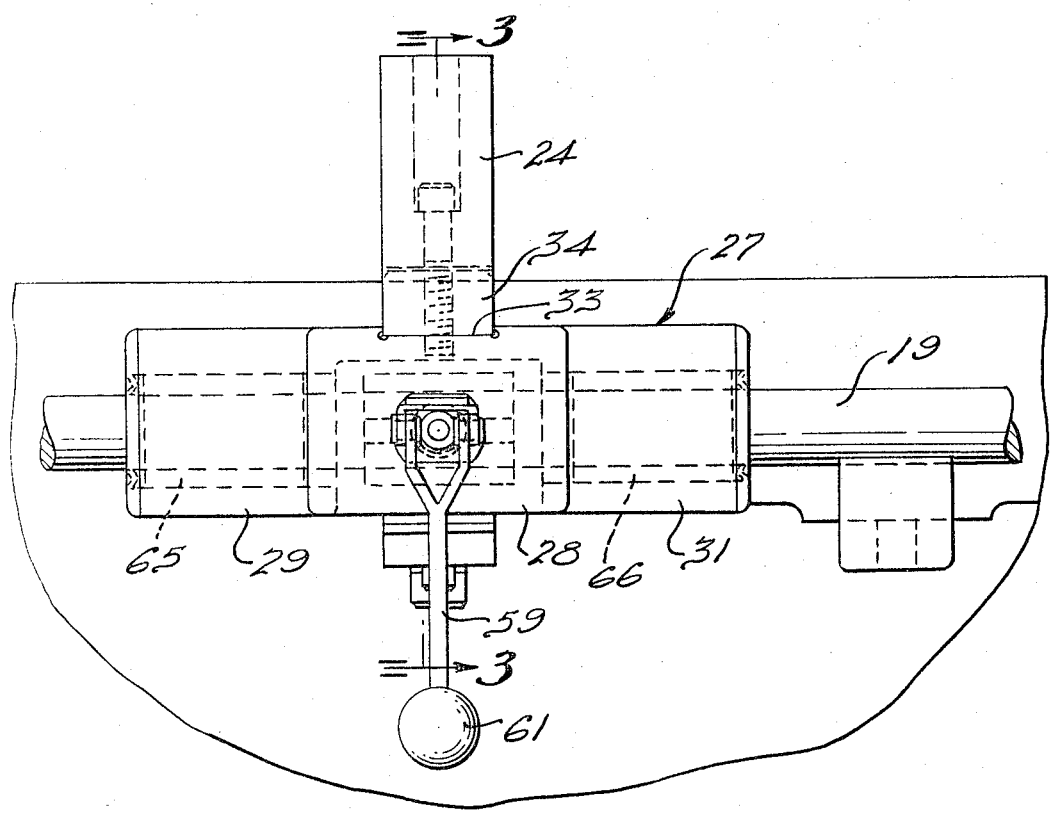
FIGURE 2 is a side elevational view of the guide and clamp, taken in the direction of the arrow 2 of FIGURE 1.

The novel guiding and clamping means for fence 24 comprises a housing generally indicated at 27. This housing is of elongated shape, and has a central section 28 and two side sections 29 and 31 on opposite sides of section 28, as seen in FIGURE 2. Section 28 supports fence 24 and also encloses the clamping means, while sections 29 and 31 enclose and support the bearing means.

Section 28 has a flat upper wall 32 with a central groove 33 extending at right angles to the axis of bar 19, as seen in FIGURE 2. The forward end of fence 24 has a downward extension 34 which is received by and fits snugly within recess 33. A pair of counterbored holes 35 and 36 are formed in the forward end of fence 24, receiving bolts 37 and 38 respectively, which serve to secure the fence to housing 27.

Section 28 has a front side wall 39 and a rear side wall 41, as seen in FIGURE 3, these walls being vertical and forming a downwardly open compartment 42. Walls 39 and 41 extend a substantial distance below bar 19, and a V-block 43 is secured to the inner surface of wall 41. This V-block is centrally located with respect to compartment 42, and has a plane of symmetry which is common with the plane of symmetry of fence 24. Inclined surfaces 44 and 45 on the block 43 are engageable with bar 19, having line contact with the bar when so engaged, with the two lines of contact being in a vertical plane. The height of clamping block 43 is considerably greater than the diameter of bar 19, so that a substantial bearing area will be present between block 43 and side wall 41.

A clamping member generally indicated at 46 is disposed on the forward side of bar 19 and is diametrically opposed to clamping block 43. Clamp 46 comprises a screw 47 having an enlarged and knurled head 48 with a flat top, this flat top being engageable with bar 19 in line contact therewith. A horizontal plane passing through this line of contact will bisect the V-notch of clamping block 43. A lock nut 49 is threaded on screw 47, at the end of a rod 51 within which screw 47 is threaded.

Rod 51 is of circular cross-sectional shape and has a smooth cylindrical surface. One end thereof is disposed within compartment 42 and is internally threaded to receive screw 47. Rod 51 is guided for sliding movement by a centrally bored guide member 52. This guide member has a portion 53 threadably mounted in front side wall 39 of housing 27. The forward end of guide member 52 is enlarged, with a spacer 54 being disposed between this enlarged end and the forwardly facing surface of side wall 39. Rod 51 extends forwardly through member 52, the forward end of rod 51 being indicated at 55 in FIGURE 3.

A link 56 is pivotally secured by a pin 57 to the enlarged forward end of guide 52, and extends forwardly therefrom. Link 56 has a pair of spaced vertical side walls connected by an upper bridge portion 58.

A handle 59 having a knob 61 at the lower end thereof is pivotally mounted at the forward end of link 56 by a pin 62. Handle 59 is movable between a substantially vertical clamping position, as seen in the figures, and an unclamping position which is somewhat less than 90° counterclockwise from the FIGURE 3 clamping position. The upper end of handle 59 is forked, as seen in FIGURE 2, and a pair of rearward extensions 63 are secured to the upper forked end of the handle. The outer ends of extension 63 are pivotally secured by a pin 64 to the forward end 55 of rod 51.

Handle 59 and extensions 63 therefore form a bell crank, and the relative positions of pins 57, 62 and 64 are such that a toggle action will be created. That is, with the handle 59 in its clamping position, as seen in FIGURE 3, the axis of pin 64 will be slightly above a plane containing the axis of pins 57 and 62, with bridge 58 forming a limit stop for the clamping position of the toggle. Screw 47 may be adjusted so that when in this clamping position, bar 19 will be firmly held between clamp head 48 and clamping block 43. When arm 59 is swung counterclockwise fwrom its FIGURE 3 position, the toggle will be broken and rod 51 will be slidably retracted to the right, link 56 pivoting counterclockwise about pivot 57.

Side sections 29 and 31 of housing 27 contain bearings 65 and 66 respectively, as seen in FIGURE 2. These housing sections are narrower than the central section and have downwardly open slots 67 so that the housing will be clear of extensions 22 of brackets 21. Bearings 65 and 66 are of an incomplete circular nature, as seen in FIGURE 3. The bearings may be of any desired sleeve or antifriction type to permit both rotational and linear movement of housing 27 with respect to bar 19. Preferably, the bearings are of an antifriction type, but in any case they have such a fit with respect to bar 19 as to permit substantially no wobbling or rocking action of housing 27 with respect to bar 19. The wide spacing of bearings 65 and 66 will also contribute to the prevention of anything but perfect rotational and translatory movement of housing 27 with respect to bar 19.

In operation, it should be observed that, in addition to the maintenance of parallelism of the fence with respect to saw 14 when the fence is being adjusted to the left or right, the novel clamping means will also prohibit any shifting action of the fence when it is being clamped or unclamped. This is because of the location of the clamping means in a centered position with respect to bearings 65 and 66 as well as the fence itself. The clamping may be preselected to be as firm as desired, but unclamping will be instantaneous and complete when handle 59 is swung counterclockwise in FIGURE 3. The entire assembly will thus eliminate the necessity of repeated clampings, unclampings and readjustments which have heretofore been necessary to obtain proper positioning with fence guiding and clamping means of the conventional type.

While it will be apparent that the preferred embodiment of the invention disclosed is well calculated to fulfill the objects above stated, it will be appreciated that the invention is susceptible to modification, variation and change without departing from the proper scope of fair meaning of the subjoined claims.

What is claimed is:

1. In a guiding and clamping means for the fence of a tilting arbor saw table, a bar secured to the forward side of said table, a housing of elongated shape partially surrounding said bar, said housing having a central clamp retaining and fence supporting section and first and second bearing sections on opposite sides of said central section, the central section having an upper wall and front and rear side walls extending downwardly therefrom to form an opened-bottomed compartment, means securing one end of said fence to the center of said upper wall, a V-block disposed within said compartment and secured to said rear wall, a clamp mounted on said front wall and movable between extended and retracted positions, said V-block and clamp having a common plane of symmetry which is the same as the plane of symmetry of said fence, and bearings in said first and second side sections, said bearings being engageable with said bar to permit rotational and axial movement of the housing with respect to said bar, but to substantially prevent any lateral play of said housing with respect to said bar.

2. The combination according to claim 1, said clamp comprising means slidably mounted in said front wall and having a portion within said compartment and engageable with said bar diametrically opposite said V-block, and means outside said housing and forwardly thereof for moving said clamp between a clamping position in engagement with said bar and an unclamping position withdrawn from said bar.

3. The combination according to claim 1, said clamp comprising a screw with an enlarged flat head facing said bar, a rod slidably mounted in said front wall and supporting said screw, a handle, and a toggle linkage interconnecting said handle, housing and rod, said toggle linkage being so arranged that said clamp will be advanced and retracted when said handle is moved in opposite directions.

4. The combination according to claim 3, said toggle linkage comprising a link having one end pivoted to said housing and the other end pivoted to said handle, and an extension on said handle pivotally connected to said rod.

5. In a guiding and clamping means for the fence of a tilting arbor saw table, a bar of circular cross section fixedly secured to the front of said table, an elongated housing on said bar having a central section and a pair of side sections on opposite sides of the central section, said central section having a flat upper wall and front and rear side walls extending downwardly therefrom to form an open-bottomed compartment, a central groove in said upper wall for securing one end of a fence thereto, a clamping block secured to said rear wall within said central section compartment, said clamping block having a notch with inclined sides facing said bar so that said inclined sides have line contact with the bar when in engagement therewith, the clamping block having a height considerably greater than the diameter of said bar, an apertured portion in said front wall, a smooth-bored guide secured within said apertured portion, a cylindrical rod slidably mounted in said guide and having a portion inside and a portion outside said compartment, a screw threadably mounted in the portion of said rod within said compartment, a lock nut on said screw engageable with said rod, an enlarged flat head on said screw capable of line contact engagement with said bar, a link having a pair of vertical sides connected by an upper web, one end of said link being connected to the forward end of said guide, an elongated handle pivotally connected to the other end of said link, extensions on said handle pivotally connected to the end of said rod outside said compartment, said link, extensions and rod forming a toggle linkage whereby said screw head will be forced against said bar when the handle is in one position and withdrawn therefrom when the handle is in another position, and first and second bearings in each said side compartments, said bearings permitting rotational and axial movement of said housing with respect to said bar but prohibiting any lateral movement thereof, said first and second bearings, screw, clamping block and fence all having a common plane of symmetry.

References Cited by the Examiner

UNITED STATES PATENTS

| | | | |
|---|---|---|---|
| 2,619,173 | 11/1952 | Crain | 143—174 XR |
| 2,850,058 | 9/1958 | Stoll | 143—174 |
| 3,060,982 | 10/1962 | Patterson | 143—174 XR |

WILLIAM W. DWYER, Jr., *Primary Examiner.*

W. D. BRAY, *Assistant Examiner.*